(12) United States Patent
Kim et al.

(10) Patent No.: US 10,311,338 B1
(45) Date of Patent: Jun. 4, 2019

(54) LEARNING METHOD, LEARNING DEVICE FOR DETECTING LANES ON THE BASIS OF CNN AND TESTING METHOD, TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang (KR)

( * ) Notice: Subject to any disclaimer, the term of this patent is extended or adjusted under 35 U.S.C. 154(b) by 0 days.

(21) Appl. No.: 16/132,368

(22) Filed: Sep. 15, 2018

(51) Int. Cl.
*G06K 9/00* (2006.01)
*G06K 9/62* (2006.01)
*G06K 7/00* (2006.01)
*G06N 3/08* (2006.01)

(52) U.S. Cl.
CPC ........ *G06K 9/6262* (2013.01); *G06K 9/00798* (2013.01); *G06N 3/08* (2013.01)

(58) Field of Classification Search
CPC .................. G06K 9/00798; G06K 9/00791
See application file for complete search history.

(56) References Cited

U.S. PATENT DOCUMENTS

| 9,081,385 | B1* | 7/2015 | Ferguson | G06K 9/00798 |
| 9,934,440 | B1* | 4/2018 | Kim | G06K 9/00791 |
| 9,947,228 | B1* | 4/2018 | Kim | G08G 1/167 |
| 10,023,204 | B1* | 7/2018 | Kim | B60W 50/14 |

OTHER PUBLICATIONS

Kim, Jihun, et al. "Fast learning method for convolutional neural networks using extreme learning machine and its application to lane detection." Neural Networks 87 (2017): 109-121. (Year: 2017).*

* cited by examiner

*Primary Examiner* — Bobbak Safaipour
(74) *Attorney, Agent, or Firm* — Xsensus, LLP

(57) ABSTRACT

A learning method of a CNN capable of detecting one or more lanes is provided. The learning method includes steps of: a learning device (a) applying convolution operations to an image, to generate a feature map, and generating lane candidate information; (b) generating a first pixel data map including information on pixels in the image and their corresponding pieces of first data, wherein main subsets from the first data include distance values from the pixels to their nearest first lane candidates by Using a direct regression, and generating a second pixel data map including information on the pixels and their corresponding pieces of second data, wherein main subsets from the second data include distance values from the pixels to their nearest second lane candidates by using the direct regression; and (c) detecting the lanes by inference to the first pixel data map and the second pixel data map.

28 Claims, 10 Drawing Sheets

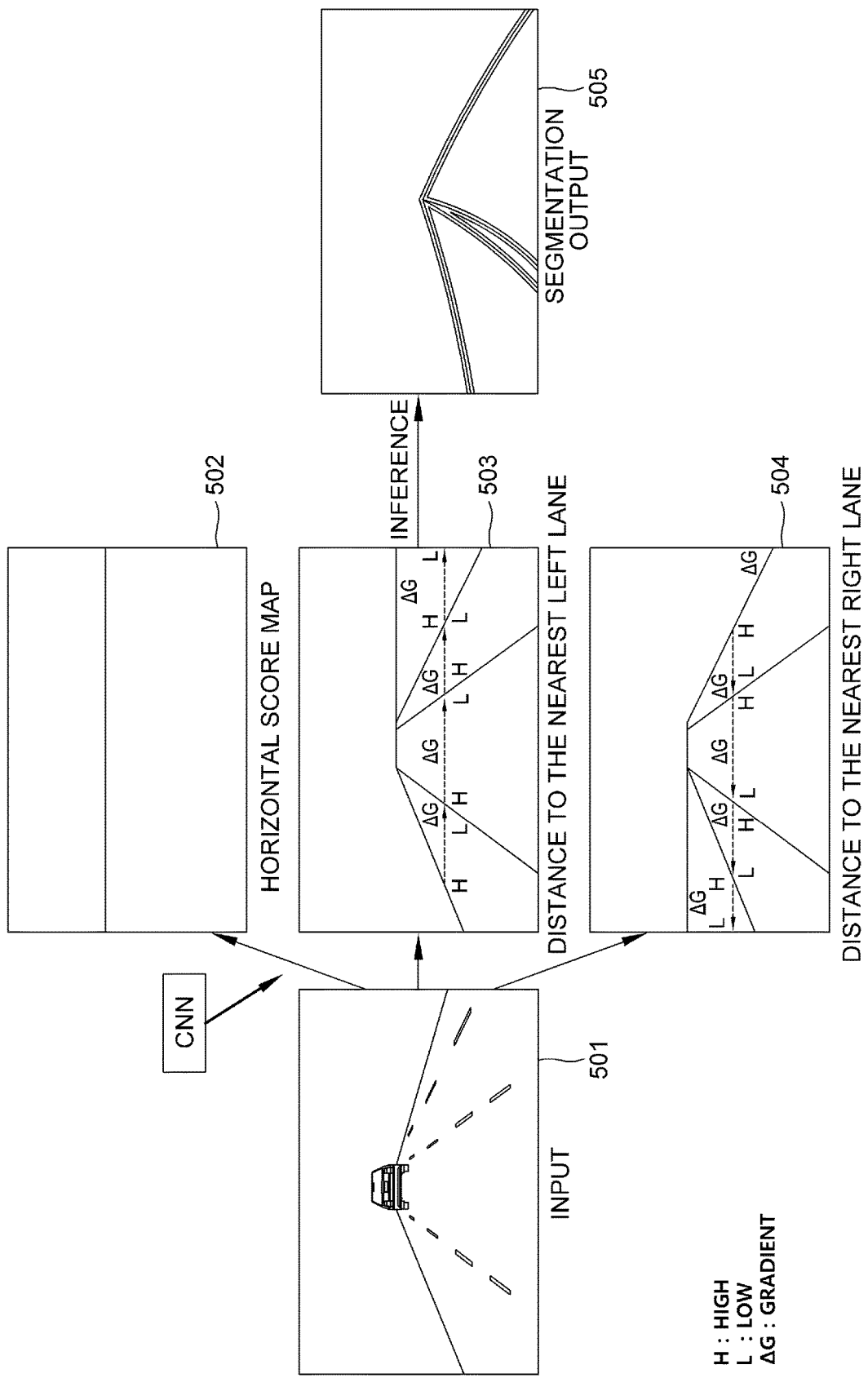

INPUT 701

SEGMENTATION OUTPUT 702

LEARNING METHOD, LEARNING DEVICE FOR DETECTING LANES ON THE BASIS OF CNN AND TESTING METHOD, TESTING DEVICE USING THE SAME

FIELD OF THE INVENTION

The present invention relates to a learning method for detecting one or more lanes of a CNN; and more particularly, to the method of the CNN capable of detecting one or more lanes, including steps of: (a) if at least one training image is acquired, applying or supporting another device to apply one or more convolution operations to the training image, to thereby generate at least one feature map, and generating or supporting another device to generate lane candidate information which represents information on lane candidates estimated by referring to segmentation scores generated by using the feature map; (b) generating or supporting another device to generate a first pixel data map including information on each of pixels in the training image and on its corresponding piece of first data, wherein one or more main subsets selected from the first data include each value generated from calculating each distance from each position of each of the pixels to its corresponding nearest first lane candidate along a first direction which is parallel to a direction of rows of the training image by using a direct regression, and generating or supporting another device to generate a second pixel data map including information on each of the pixels and on its corresponding piece of second data, wherein one or more main subsets selected from the second data include each value generated from calculating each distance from said each position of each of the pixels to its corresponding nearest second lane candidate along a second direction which is parallel to the direction of the rows of the training image by using the direct regression; and (c) detecting or supporting another device to detect the lanes by inference to the first pixel data map and the second pixel data map, and a learning device, a testing method, and a testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer may classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolutional neural network became a very useful tool in the field of the machine learning.

FIG. 1 shows an example of various outputs to be acquired from a photograph using a deep CNN according to prior art.

Classification is a method for identifying a type of a class to be acquired from a photograph, for example, as shown in FIG. 1, determining whether an acquired object is a person, a lamb, or a dog. Detection is a method for finding every object and displaying the found object as enclosed in its corresponding bounding box. Segmentation is a method for distinguishing a region of a specific object from other objects in a photograph. As the deep learning has recently become popular, the classification, the detection, and the segmentation are using the deep learning heavily.

FIG. 2 is a simplified drawing of a conventional lane detection method using a CNN, and FIG. 3 is a simplified drawing of a general CNN segmentation process.

First of all, by referring to FIG. 3, according to the conventional lane detection method, a learning device receives an input image, generates encoded feature maps by multiple convolution operations and non-linear operations like ReLU in multiple convolutional layers, and generates a segmentation result by performing multiple deconvolution operations in multiple deconvolutional layers and SoftMax operations on a last one of decoded feature maps.

Also, by referring to FIG. 2, a reference numeral 210 represents the input image, a reference numeral 220 represents the segmentation result, and a reference numeral 230 represents lanes generated by line fitting. The segmentation result 220 according to the conventional lane detection method is comprised of the lanes and a background as illustrated in 220 of FIG. 2. The segmentation result is expressed as probability estimation. Some lane candidates are found by sampling pixels with high probabilities of being on any lane among candidate pixels selected as such, and then the lanes 230 are finally determined by using a lane modeling function acquired from the lane candidate.

However, such the conventional lane detection method has a problem in that it is based on the segmentation result only. In general, the segmentation result itself does not suffice for accurate detection of the lanes. In order to resolve the problem, the method of line fitting by post-processing of the segmentation result is used. However, if the segmentation result is inaccurate, the line fitting will not be much help in the accurate lane detection.

SUMMARY OF THE INVENTION

It is an object of the present invention to solve all the aforementioned problems.

It is another object of the present invention to provide a learning method for generating more accurate segmentation results from an input image.

It is still another object of the present invention to detect the lanes more accurately, by generating the segmentation results based on additional information on a gradient on a distance from each corresponding pixel of lane candidates along a right direction and a gradient on a distance from each corresponding pixel of the lane candidates along a left direction.

In accordance with one aspect of the present invention, there is provided a learning method of a CNN capable of detecting one or more lanes, including steps of: (a) a learning device, if at least one training image is acquired, applying or supporting another device to apply one or more convolution operations to the training image, to thereby generate at least one feature map, and generating or supporting another device to generate lane candidate information which represents information on lane candidates estimated by referring to segmentation scores generated by using the feature map; (b) the learning device generating or supporting another device to generate a first pixel data map including information on each of pixels in the training image and on its corresponding piece of first data, wherein one or more main subsets selected from the first data include each value generated from calculating each distance from each position of each of the pixels to its corresponding nearest first lane candidate along a first direction which is parallel to a direction of rows of the training image by using a direct regression, and generating or supporting another device to generate a second pixel data map including information on each of the pixels and on its corresponding piece of second data, wherein one or more main subsets selected from the second data include each value generated from calculating each distance from said each position of each of the pixels to its corresponding nearest second lane candidate along a second direction which is parallel to the direction of the rows of the training image by using the direct regression; and (c) the learning device detecting or supporting another device to detect the lanes by inference to the first pixel data map and the second pixel data map.

As one example, the lanes are detected by referring to information on a first part of the pixels having its value less than a certain threshold in the first pixel data map and the second pixel data map.

As one example, at the step of (a), the learning device, if at least one specific row which has no lane candidate is determined as present by referring to the segmentation scores, allocates or supports another device to allocate a first value to one or more pixels which are present on either the specific row or any row above the specific row, and allocating or supporting another device to allocate a second value to one or more pixels which are present below the specific row, to thereby generate a third pixel data map, wherein, at the step of (c), the lanes are detected by inference to the first pixel data map, the second pixel data map, and the third pixel data map.

As one example, the lanes are detected by referring to information on an intersection of (i) a first part of the pixels having its value less than a certain threshold in the first pixel data map and the second pixel data map and (ii) a second part of the pixels which are present below the specific row in the third pixel data map.

As one example, the first value is a zero which represents a background.

As one example, the learning method further includes a step of: (d) the learning device performing or supporting another device to perform processes of generating at least one first loss by referring to at least one first GT corresponding to the first pixel data map, generating at least one second loss by referring to at least one second GT corresponding to the second pixel data map, generating at least one third loss by referring to at least one third GT corresponding to the third pixel data map, and backpropagating the first loss, the second loss, and the third loss, to thereby learn parameters of the CNN.

As one example, said each value generated from said each distance calculated by the direct regression is one of each pixel distance from said each position of each of the pixels to its corresponding nearest first lane candidate along the first direction and each pixel distance from said each position of each of the pixels to its corresponding nearest second lane candidate along the second direction.

As one example, complementary subsets of the first data, other than the main subsets of the first data, which do not require a calculation of any distance are assigned with infinity values.

In accordance with another aspect of the present invention, there is provided a testing method of a CNN capable of detecting one or more lanes, including steps of: (a) a testing device acquiring or supporting another device to acquire at least one test image, on condition that a learning device, (i) has applied one or more convolution operations to at least one training image, to thereby generate at least one feature map for training, and has generated lane candidate information for training which represents information on lane candidates estimated by referring to segmentation scores for training generated by using the feature map for training, has generated a first pixel data map for training including information on each of pixels in the training image and on its corresponding piece of first data for training, wherein one or more main subsets selected from the first data for training include each value generated from calculating each distance from each position of each of the pixels to its corresponding nearest first lane candidate for training along a first direction which is parallel to a direction of rows of the training image by using a direct regression, and has generated a second pixel data map for training including information on each of the pixels and on its corresponding piece of second data for training, wherein one or more main subsets selected from the second data for training include each value generated from calculating each distance from said each position of each of the pixels to its corresponding nearest second lane candidate for training along a second direction which is parallel to the direction of the rows of the training image by using the direct regression, (iii) has detected the lanes by inference to the first pixel data map for training and the second pixel data map for training, and (iv) has generated at least one first loss by referring to at least one first GT corresponding to the first pixel data map, and has generated at least one second loss by referring to at least one second corresponding to the second pixel data map, and backpropagating the first loss, and the second loss, to thereby learn one or more parameters of the CNN; (b) the testing device, applying or supporting another device to apply the convolution operations to the test image, to thereby generate at least one feature map for testing, and generating or supporting another device to generate lane candidate information for testing which represents information on lane candidates estimated by referring to segmentation scores for testing generated by using the feature map for testing; (c) the testing device generating or supporting another device to generate a first pixel data map for testing including information on each of pixels in the test image and on its corresponding piece of first data for testing, wherein one or more main subsets selected from the first data for testing include each value generated from calculating each distance from each position of each of the pixels to its corresponding nearest first lane candidate for testing along the first direction by using the direct regression, and generating or supporting another device to generate a second pixel data map for testing including information on each of the pixels and on its corresponding piece of second data for testing, wherein one or more main subsets selected from the second data for testing include each value generated from calculating each distance from said each position of each of the pixels to its corresponding nearest second lane candidate for testing along the second direction by using the direct regression; and (d) the testing device detecting or supporting another device to detect the lanes by inference to the first pixel data map for testing and the second pixel data map for testing.

As one example, the lanes are detected by referring to information on a first part of the pixels having its value less than a certain threshold in the first pixel data map for testing and the second pixel data map for testing.

As one example, at the step of (b), the testing device, if at least one specific row which has no lane candidate is determined as present by referring to the segmentation scores for testing, allocating or supporting another device to allocate a first value to one or more pixels which are present on either the specific row or any row above the specific row, and allocating or supporting another device to allocate a second value to one or more pixels which are present below the specific row, to thereby generate a third pixel data map for testing, and, at the step of (d), the lanes are detected by inference to the first pixel data map for testing, the second pixel data map for testing, and the third pixel data map for testing.

As one example, the lanes are detected by referring to information on an intersection of (i) a first part of the pixels having its value less than a certain threshold in the first pixel data map for testing and the second pixel data map for testing and (ii) a second part of the pixels which are present below the specific row in the third pixel data map for testing.

As one example, said each value generated from said each distance calculated by the direct regression is one of each pixel distance from said each position of each of the pixels to its corresponding nearest first lane candidate for testing along the first direction and each pixel distance from said each position of each of the pixels to its corresponding nearest second lane candidate for testing along the second direction.

As one example, complementary subsets of the first data for testing, other than the main subsets of the first data for testing a, which do not require a calculation of any distance are assigned with infinity values.

In accordance with still another aspect of the present invention, there is provided a learning device of a CNN capable of detecting one or more lanes, including: a communication part for acquiring at least one training image; and a processor for performing processes of (I) applying or supporting another device to apply one or more convolution operations to the training image, to thereby generate at least one feature map, and generating or supporting another device to generate lane candidate information which represents information on lane candidates estimated by referring to segmentation scores generated by using the feature map; (II) generating or supporting another device to generate a first pixel data map including information on each of pixels in the training image and on its corresponding piece of first data, wherein one or more main subsets selected from the first data include each value generated from calculating each distance from each position of each of the pixels to its corresponding nearest first lane candidate along a first direction which is parallel to a direction of rows of the training image by using a direct regression, and generating or supporting another device to generate a second pixel data map including information on each of the pixels and on its corresponding piece of second data, wherein one or more main subsets selected from the second data include each value generated from calculating each distance from said each position of each of the pixels to its corresponding nearest second lane candidate along a second direction which is parallel to the direction of the rows of the training image by using the direct regression; and (III) detecting or supporting another device to detect the lanes by inference to the first pixel data map and the second pixel data map.

As one example, the lanes are detected by referring to information on a first part of the pixels having its value less than a certain threshold in the first pixel data map and the second pixel data map.

As one example, at the process of (I), the processor, if at least one specific row which has no lane candidate is determined as present by referring to the segmentation scores, allocates or supports another device to allocate a first value to one or more pixels which are present on either the specific row or any row above the specific row, and allocating or supporting another device to allocate a second value to one or more pixels which are present below the specific row, to thereby generate a third pixel data map, and, at the process of (III), the lanes are detected by inference to the first pixel data map, the second pixel data map, and the third pixel data map.

As one example, the lanes are detected by referring to information on an intersection of (i) a first part of the pixels having its value less than a certain threshold in the first pixel data map and the second pixel data map and (ii) a second part of the pixels which are present below the specific row in the third pixel data map.

As one example, the first value is a zero which represents a background.

As one example, the processor further performs a process of: (IV) generating or supporting another device to generate at least one first loss by referring to at least one first GT corresponding to the first pixel data map, generating or supporting another device to generate at least one second loss by referring to at least one second GT corresponding to the second pixel data map, generating or supporting another device to generate at least one third loss by referring to at least one third GT corresponding to the third pixel data map, and backpropagating or supporting another device to backpropagate the first loss, the second loss, and the third loss, to thereby learn parameters of the CNN.

As one example, said each value generated from said each distance calculated by the direct regression is one of each pixel distance from said each position of each of the pixels to its corresponding nearest first lane candidate along the first direction and each pixel distance from said each position of each of the pixels to its corresponding nearest second lane candidate along the second direction.

As one example, complementary subsets of the first data, other than the main subsets of the first data, which do not require a calculation of any distance are assigned with infinity values.

In accordance with still yet another aspect of the present invention, there is provided a testing device of a CNN capable of detecting one or more lanes, including: a communication part for acquiring or supporting another device to acquire at least one test image, on condition that a learning device (i) has applied one or more convolution operations to at least one training image, to thereby generate at least one feature map for training, and has generated lane candidate information for training which represents information on lane candidates estimated by referring to segmentation scores for training generated by using the feature map for training, (ii) has generated a first pixel data map for training including information on each of pixels in the training image and on its corresponding piece of first data for training, wherein one or more main subsets selected from the first data for training include each value generated from calculating each distance from each position of each of the pixels to its corresponding nearest first lane candidate for training along a first direction which is parallel to a direction of rows of the training image by using a direct regression, and has generated a second pixel data map for training including information on each of the pixels and on its corresponding piece of second data for training, wherein one or more main subsets selected from the second data for training include each value generated from calculating each distance from said each position of each of the pixels to its corresponding nearest second lane candidate for training along a second direction which is parallel to the direction of the rows of the training image by using the direct regression, (iii) has detected the lanes by inference to the first pixel data map for training and the second pixel data map for training, and (iv) has generated at least one first loss by referring to at least one first GT corresponding to the first pixel data map, and has generated at least one second loss by referring to at least one second GT corresponding to the second pixel data map, and backpropagating the first loss, and the second loss, to thereby learn one or more parameters of the CNN; and a processor for (I) applying or supporting another device to apply the convolution operations to the test image, to thereby generate at least one feature map for testing, and generating or supporting another device to generate lane candidate information for testing which represents information on lane candidates estimated by referring to segmentation scores for testing generated by using the feature map for testing; (II) generating or supporting another device to generate a first pixel data map for testing including information on each of pixels in the test image and on its corresponding piece of first data for testing, wherein one or more main subsets selected from the first data for testing include each value generated from calculating each distance from each position of each of the pixels to its corresponding nearest first lane candidate for testing along the first direction which is parallel to a direction of rows of the test image by using the direct regression, and generating or supporting another device to generate a second pixel data map for testing including information on each of the pixels and on its corresponding piece of second data for testing, wherein one or more main subsets selected from the second data for testing include each value generated from calculating each distance from said each position of each of the pixels to its corresponding nearest second lane candidate for testing along the second direction which is parallel to the direction of the rows of the test image by using the direct regression; and (III) detecting or supporting another device to detect the lanes by inference to the first pixel data map for testing and the second pixel data map for testing.

As one example, the lanes are detected by referring to information on a first part of the pixels having its value less than a certain threshold in the first pixel data map for testing and the second pixel data map for testing.

As one example, at the process of (II), the processor, if at least one specific row which has no lane candidate is determined as present by referring to the segmentation scores for testing, allocates or supports another device to allocate a first value to one or more pixels which are present on either the specific row or any row above the specific row, and allocating or supporting another device to allocate a second value to one or more pixels which are present below the specific row, to thereby generate a third pixel data map for testing, and, at the process of (III), the lanes are detected by inference to the first pixel data map for testing, the second pixel data map for testing, and the third pixel data map for testing.

As one example, the lanes are detected by referring to information on an intersection of (i) a first part of the pixels having its value less than a certain threshold in the first pixel data map for testing and the second pixel data map for testing and (ii) a second part of the pixels which are present below the specific row in the third pixel data map for testing.

As one example, said each value generated from said each distance calculated by the direct regression is one of each pixel distance from said each position of each of the pixels to its corresponding nearest first lane candidate for testing along the first direction and each pixel distance from said each position of each of the pixels to its corresponding nearest second lane candidate for testing along the second direction.

As one example, complementary subsets of the first data for testing, other than the main subsets of the first data for testing, which do not require a calculation of any distance are assigned with infinity values.

BRIEF DESCRIPTION OF THE DRAWINGS

The above and other objects and features of the present invention will become apparent from the following description of preferred embodiments given in conjunction with the accompanying drawings, in which:

FIG. 5 is a drawing exemplarily illustrating the process of the lane detection method by using three pixel data maps in accordance with the present invention.

DETAILED DESCRIPTION OF THE PREFERRED EMBODIMENTS

Figure 1:
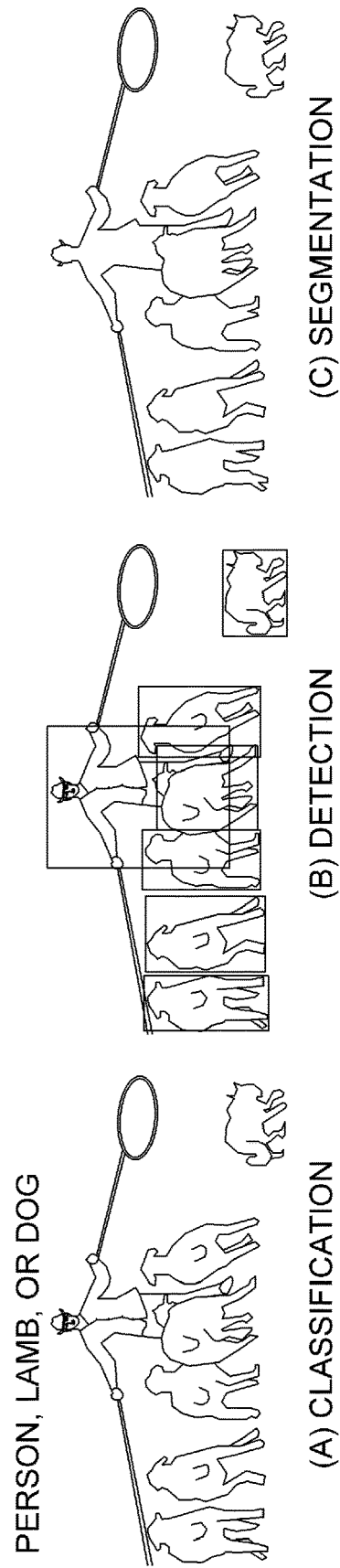
FIG. 1 is a drawing schematically illustrating examples of various outputs generated from a photograph using a conventional CNN.
Figure 2:
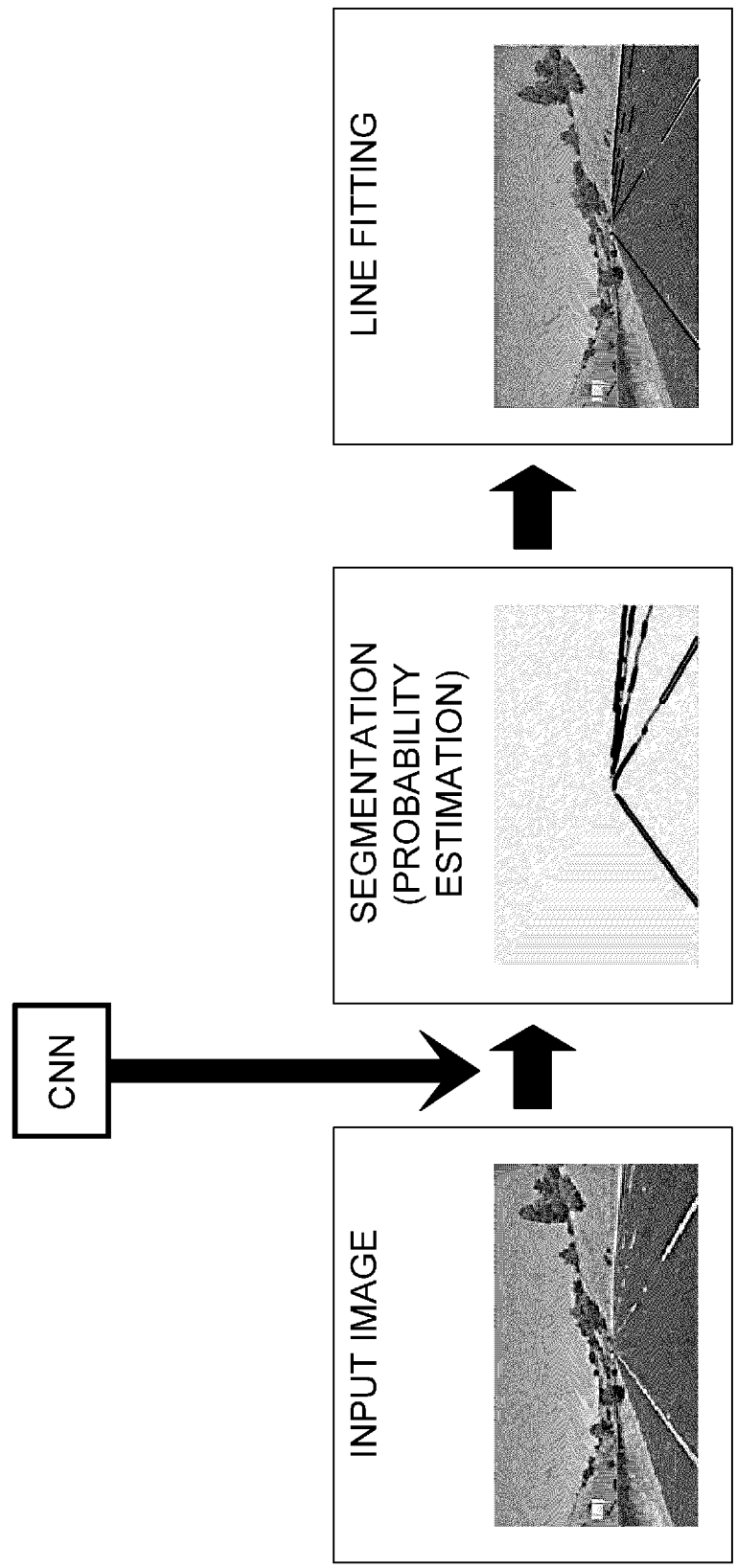
FIG. 2 is a drawing schematically illustrating a conventional lane detection method using the conventional CNN.
Figure 3:
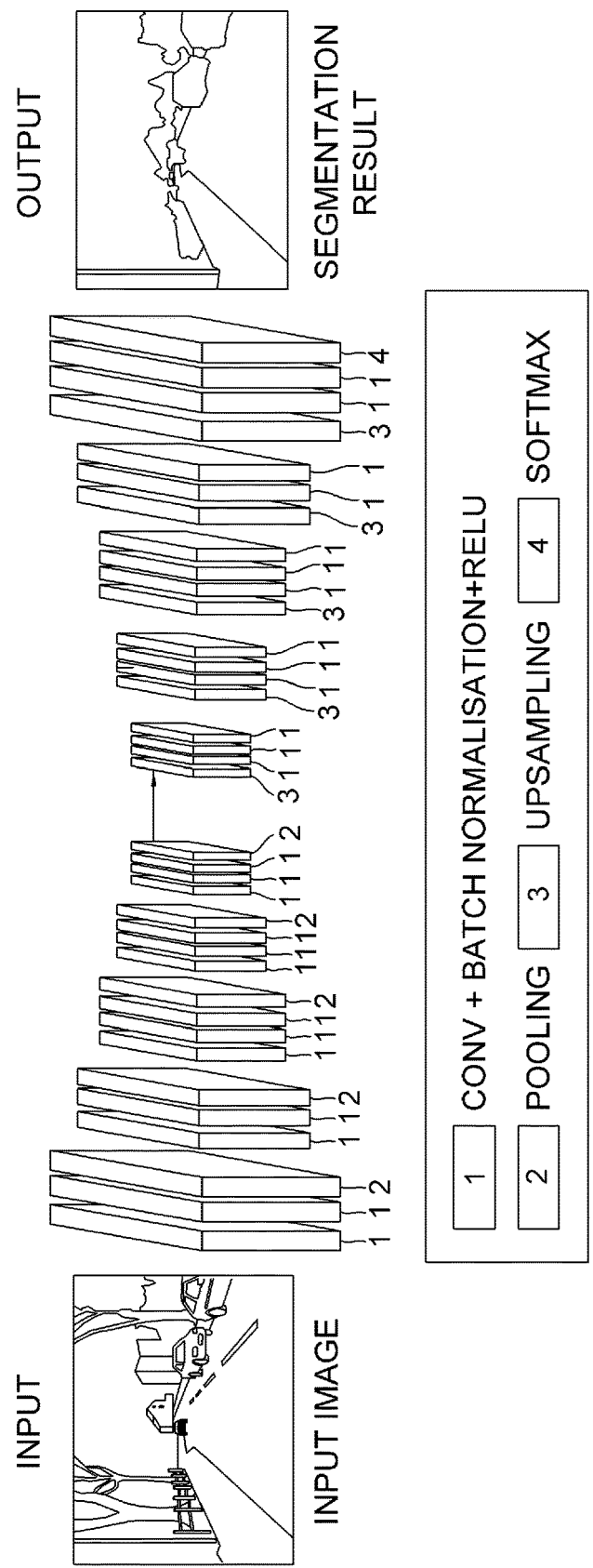
FIG. 3 is a drawing schematically illustrating a conventional process of a general segmentation by using the conventional CNN.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

Figure 4:
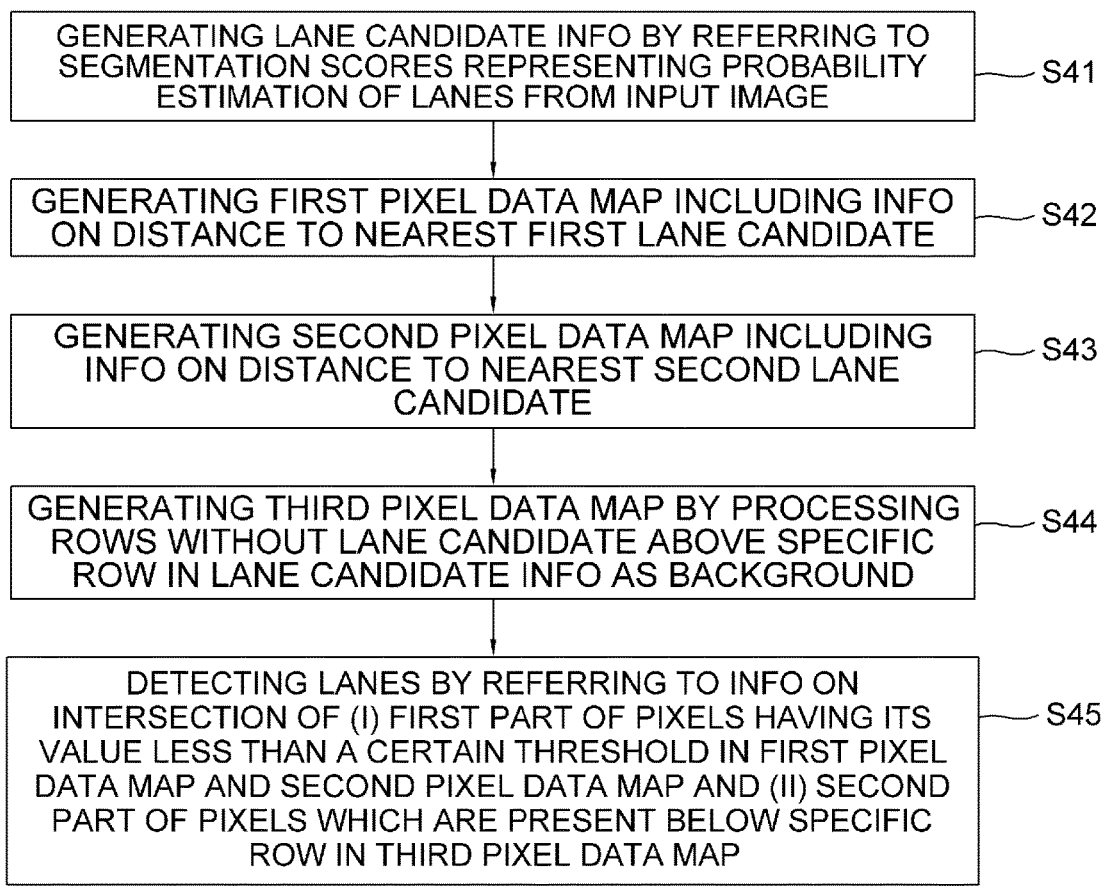
FIG. 4 is a flow chart schematically illustrating a process of a lane detection method based on a CNN in accordance with the present invention.
Figure 6A:
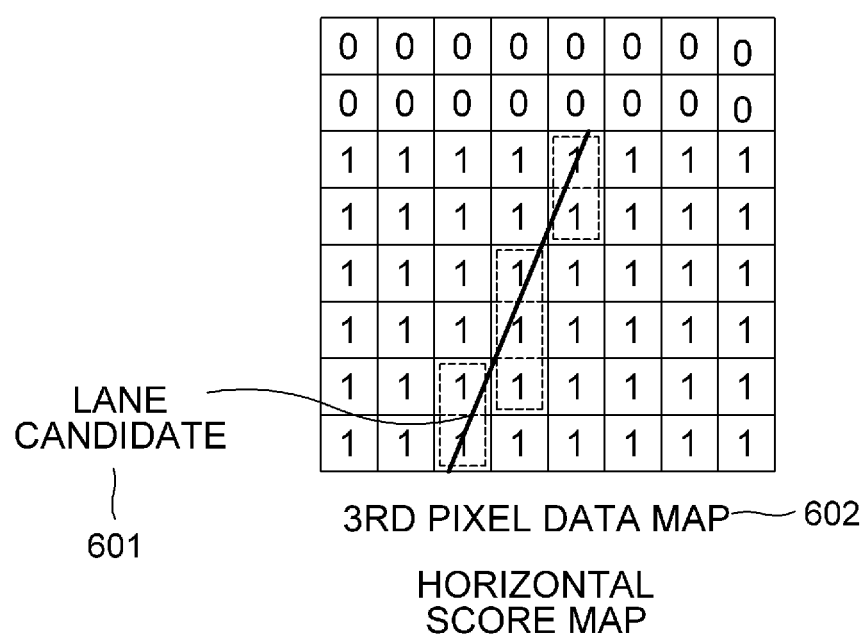
FIGS. 6A to 6C are drawings illustrating examples of the three pixel data maps in accordance with the present invention.
Figure 6B:
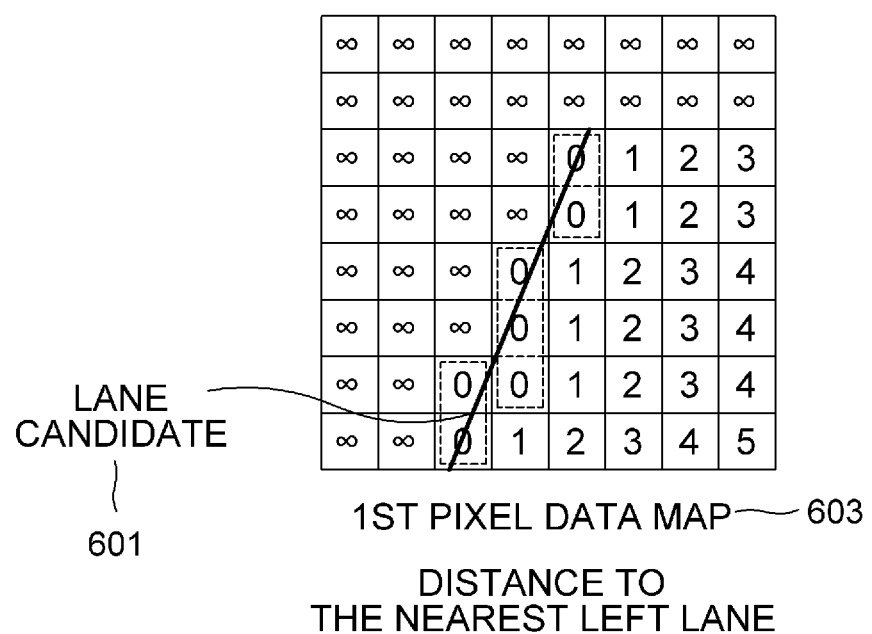
Figure 6C:
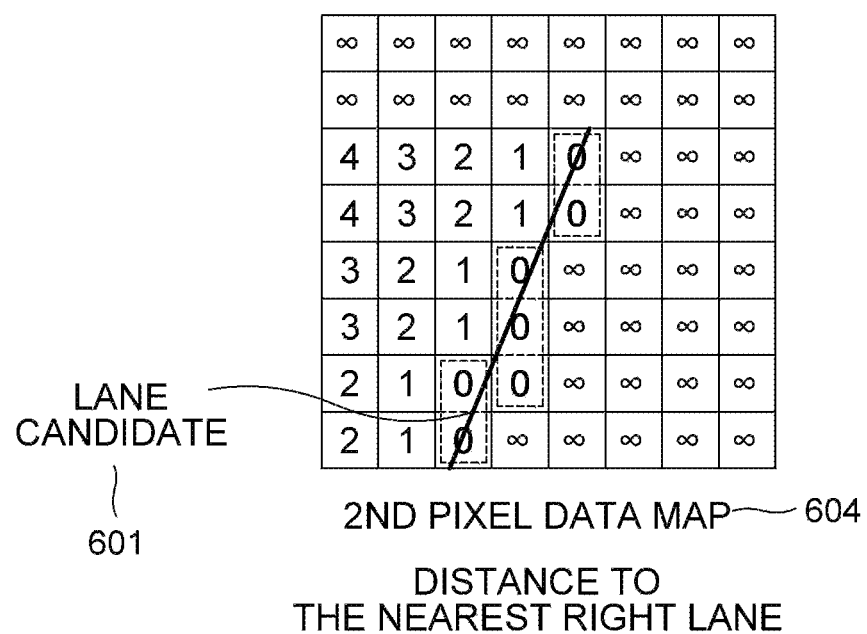

FIG. 4 is a flow chart schematically illustrating a process of detecting one or more lanes based on a CNN in accordance with the present invention, FIG. 5 is a drawing exemplarily illustrating the process of detecting the lanes by using three pixel data maps in accordance with the present invention, and FIGS. 6A to 6C are drawings illustrating examples of the three pixel data maps in accordance with the present invention.

By referring to FIGS. 4 to 6C, the method of detecting the lanes based on the CNN in accordance with the present invention is as follows.

First, at a step of S41, a learning device may perform or support another device to perform processes of acquiring at least one input image as a training image, applying one or more convolution operations to the training image, to thereby generate a feature map, generating one or more segmentation scores by using the feature map, and generating lane candidate information which represents information on lane candidates estimated by referring the segmentation scores. The segmentation scores may be generated in a form of a score map, and pixels having scores greater than a certain threshold in the score map may be determined as the lane candidates. For reference, a meaning of "the segmentation scores are generated by using the feature map" may represent that the segmentation scores are generated by applying one or more deconvolution operations to the feature map, but the scope of the present invention is not limited thereto.

Then, at a step of S42, the learning device may generate or support another device to generate a first pixel data map including information on each of pixels in the training image and on its corresponding piece of first data, where one or more main subsets selected from the first data include each value generated from calculating each distance from each position of each of the pixels to its corresponding nearest first lane candidate along a first direction, i.e., left, which is parallel to a direction of rows, i.e., horizontal, of the training image by using a direct regression. Said each value generated from said each distance calculated by the direct regression may be one of each pixel distance from said each position of each of the pixels to its corresponding nearest first lane candidate along the first direction.

FIG. 6A will be explained later, because the most important process of the present invention is related to FIGS. 6B and 6C thus their explanation beforehand is in order, and because the process in FIG. 6A is not a requirement. If the process in FIG. 6A is performed, then the processes in FIGS. 6B and 6C may be performed thereafter, but the scope of the present invention is not limited thereto.

By referring to FIG. 6B, pixels indicated as zeros may be pixels determined as the lane candidate 601 at the step of S41. Thus, in the first pixel data map 603, each of the pixels corresponding to the lane candidate 601 may be indicated as 0 because the distance from itself is 0. The pixels that are one pixel away from the lane candidate 601 along the right direction may be allocated with 1 as their first data, because the pixels of the lane candidate 601 are positioned at one pixel distance from the pixels along the left direction. The pixels that are two pixels away from the lane candidate 601 along the right direction may be allocated with 2 as their first data, because the pixels of the lane candidate 601 are positioned at two pixel distances from the pixels along the left direction, and the pixels that are three pixels away from the lane candidate 601 along the right direction may be allocated with 3 as their first data, because the pixels of the lane candidate 601 are positioned at three pixel distances from the pixels along the left direction. The first pixel data map 603 may be generated by allocating the first data to every pixel as such.

However, in case of pixels that are more than a certain threshold away from the pixels of the lane candidate 601, calculating their distances to the nearest lane candidate 601 by the direct regression is meaningless, thus their distances are indicated as infinities rather than calculated values, for efficiency. Therefore, as illustrated in FIG. 6B, every pixel on the left side of the lane candidate 601 is indicated as an infinity ∞ in the first pixel data map 603. Clearly, even in case of some pixels on the left side of a specific lane candidate, if said some pixels are on the right side of another lane candidate and a distance from said another lane candidate is less than a certain threshold, the distance from said another lane candidate may be allocated as the first data.

By referring to FIG. 5, if the lane candidates include several lanes, each of the pixels may have one piece of the first data because only the distance to the nearest lane candidate is calculated by the direct regression. Therefore, because the first pixel data map 503 in FIG. 5 may have multiple lane candidates per each row, then, the first data per each row may increase in the right direction away from each lane candidate and if it reaches another lane candidate, may start again from 0 and increase. The first pixel data map 503 resulting from the CNN operations may include the first data representing each distance to the nearest left lane, and in FIG. 5, they are presented as gradients rather than as each piece of the first data.

Then, at a step of S43, the learning device may generate or support another device to generate a second pixel data map including information on each of pixels in the training image and on its corresponding piece of second data, where one or more main subsets selected from the second data include each value generated from calculating each distance from each position of each of the pixels to its corresponding nearest second lane candidate along a second direction, i.e., right, which is parallel to the direction of rows, i.e., horizontal, of the training image by using the direct regression. Said each value generated from said each distance calculated by the direct regression may be one of each pixel distance from said each position of each of the pixels to its corresponding nearest second lane candidate along the second direction.

By referring to FIG. 6C, pixels indicated as zeros may be the pixels determined as the lane candidate 601 at the step of S41. Thus, in the second pixel data map 604, each of the pixels corresponding to the lane candidate 601 may be indicated as 0 because the distance from itself is 0. The pixels that are one pixel away from the lane candidate 601 along the left direction may be allocated with 1 as their second data, because the pixels of the lane candidate 601 are positioned at one pixel distance from the pixels along the right direction. The pixels that are two pixels away from the lane candidate 601 along the left direction may be allocated with 2 as their second data, because the pixels of the lane candidate 601 are positioned at two pixel distances from the pixels along the right direction, and the pixels that are three pixels away from the lane candidate 601 along the left direction may be allocated with 3 as their second data, because the pixels of the lane candidate 601 are positioned at three pixel distances from the pixels along the right direction. The second pixel data map 604 may be generated by allocating the second data to every pixel as such.

Also in the second pixel data map 604, in case of pixels that are more than a certain threshold away from the pixels f the lane candidate, calculating their distances to the nearest second lane candidate 601 by the direct regression is meaningless, thus their distances are indicated as the infinities rather than their calculated values. Clearly, even in case of some pixels on the right side of a specific lane candidate, if said some pixels are on the left side of another lane candidate and a distance from said another lane candidate is less than a certain threshold, the distance from said another lane candidate may be allocated as the second data.

By referring to FIG. 5, if the lane candidates include several lanes, each of the pixels may have one piece of the second data because only the distance to the nearest lane candidate is calculated by the direct regression. Therefore, because the second pixel data map 504 in FIG. 5 may have multiple lane candidates per each row, then, the second data per each row may increase in the left direction away from each lane candidate and if it reaches another lane candidate, may start again from 0 and increase. The second pixel data map 504 resulting from the CNN operations of FIG. 5 may represent each distance to the nearest right lane, and in FIG. 5, they are presented as gradients rather than as each piece of the second data.

At a step of S44, if at least one specific row which has no lane candidate is determined as present by referring to the segmentation scores, i.e., the score map generated at the step of S41, then the learning device may allocate or support another device to allocate a first value to one or more pixels which are present on either the specific row or any row above the specific row, and may allocate or support another device to allocate a second value to one or more pixels which are present below the specific row, to thereby generate a third pixel data map. Meanwhile, the step of S42 to the step of S43 may be performed in their order of appearance, or the step of S42 and the step of S43 may be performed after the step of S44, or the step of S42 and the step of 343 may be performed without the step of S44. Also, the step of S42 and the step of S43 may be performed simultaneously, or either of the steps may be performed beforehand.

By referring to FIG. 6A, the pixels determined as the lane candidate 601 may be allocated with the second value, i.e., 1. Also, every pixel on the rows which include the pixels of the lane candidate 601 may be allocated with the second value, i.e., 1. Pixels on a specific row having none of the pixels of the lane candidate 601 and on the rows above the specific rows may be allocated with the first value, i.e., 0, to thereby generate the third pixel data map 602. Herein, the first value may be 0 which represents a background.

In general, in the course of driving, the lanes on a road are present below a specific row on an image seen from the driver's perspective, and only the background such as the sky or mountains is present above the specific row. Therefore, when detecting the lanes, rows without any pixels of the lane candidate may be considered as the background. Therefore, the third pixel data map 602 in FIG. 6A may be generated to have the specific row without any pixels of the lane candidate 601 and the rows above the specific row as the background, and to have the pixels on the rows below the specific rows as pixels which have probabilities of being the lanes.

By referring to FIG. 5, a horizontal score map, i.e., the third pixel data map 502, may be generated by processing the rows without any lane candidate above the specific row as the background, by referring to the segmentation score map or another segmentation score map modified therefrom.

At a step of S45, the lanes are detected by inference to the first pixel data map and the second pixel data map, or by inference to the first pixel data map, the second pixel data map, and the third pixel data map.

For example, the lanes may be detected based on a first part of the pixels having its value less than the certain threshold in the first pixel data map and the second pixel data map, or detected by referring to information on an intersection of (i) the first part of the pixels and (ii) a second part of the pixels which are present below the specific row, i.e., which are allocated with the second value, in the third pixel data map.

As one example, at least one segmentation result 505 may be generated by selecting each pixel with its first data and its second data equal to or less than 3 in the first pixel data map and the second pixel data map, among the second part of the pixels, i.e., pixels with the second values in the third pixel data map, and the lanes may be detected based on the segmentation result 505. Although the segmentation result 505 in FIG. 5 is not illustrated with gradient, unlike the first pixel data map 503 or the second pixel data map 504, the segmentation result 505 may include pixels having gradient values within a certain range, e.g., 3 pixels, from the pixels of the lane candidate 601, along row-wise directions, i.e., along the left direction and/or along the right direction.

By referring to FIG. 5, once the CNN in accordance with the present invention applies a series of operations to the input image 501, three outputs, i.e., the third pixel data map 502 representing the horizontal score map, the first pixel data map 503 representing the distance to the nearest left lane, and the second pixel data map 504 representing the distance to the nearest right lane may be generated. If the CNN is used for the learning device, the CNN may further perform processes of generating at least one first loss by referring to at least one first GT corresponding to the first pixel data map 503, generating at least one second loss by referring to at least one second GT corresponding to the second pixel data map 504, generating at least one third loss by referring to at least one third GT corresponding to the third pixel data map 502, and backpropagating the first loss, the second loss, and the third loss, to thereby learn or optimize parameters of the CNN.

Figure 7A:
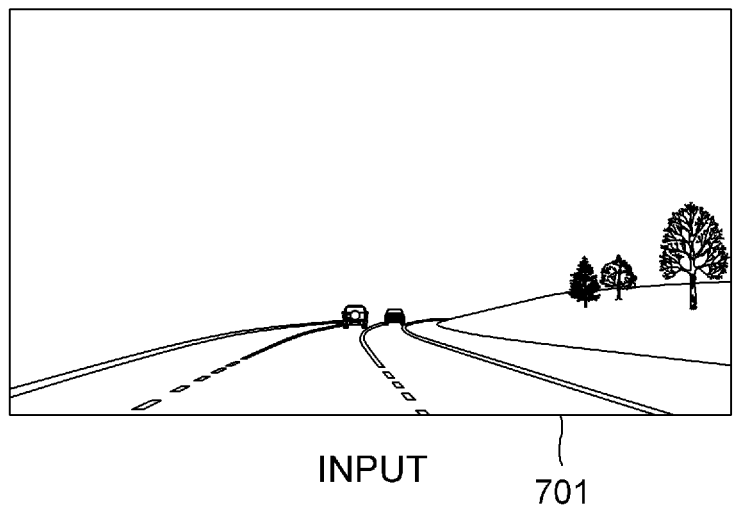
FIGS. 7A and 7B are drawings illustrating examples of a segmentation result generated by the lane detection method in accordance with the present invention.
Figure 7B:
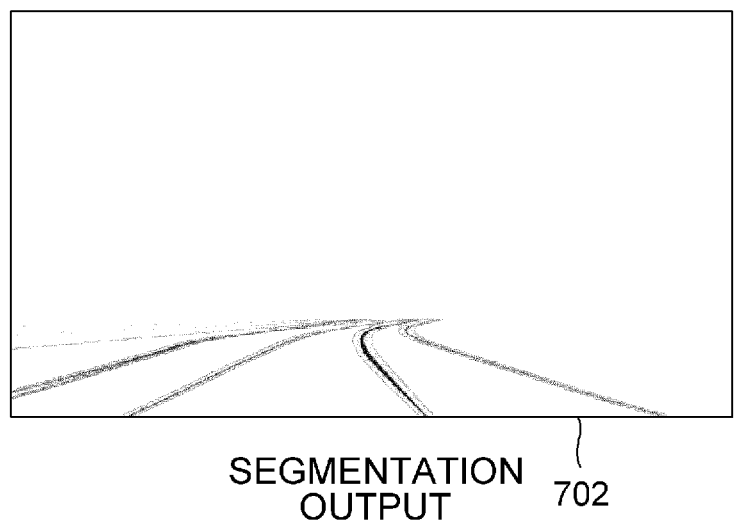

FIGS. 7A and 7B are drawings illustrating examples of the segmentation result generated by the lane detection method in accordance with the present invention.

The input image 701 in FIG. 7A may be acquired and inputted into the CNN in accordance with the present invention, and the segmentation result, i.e., the segmentation output 702, may be generated by inference to the three outputs. As can be seen in FIG. 7B, the segmentation result may be generated where each pixel within a certain range from the pixels of the lane candidate along the row-wise directions has its corresponding score, and as a result, the inaccurate segmentation scores generated at the step of S41 may be refined into a more accurate segmentation result by the direct regression.

Even if the CNN is used for a testing device, the processes of the lane detection method used in the learning processes mentioned above still apply. That is, the processes of the lane detection may be used for learning or optimizing the parameters of the CNN, and the resulting parameters from this may be applied to the testing device to thereby detect the lanes in at least one test image.

For reference, in the description below, the phrase "for training" is added for terms related to the learning processes described above, and the phrase "for testing" is added for terms related to testing processes, to avoid possible confusion.

That is, the testing method of the lane detection using the CNN in accordance with the present invention may include steps of a testing device, which uses the parameters of the CNN learned by the learning device, acquiring the test image, on condition that the learning device (i) has applied the convolution operations to the training image, to thereby generate a feature map for training, and has generated lane candidate information for training which represents information on lane candidates estimated by referring to segmentation scores which are generated by using the feature map for training; (ii) has generated a first pixel data map for training including information on each of pixels in the training image and on its corresponding piece of first data, wherein one or more main subsets selected from the first data include each value generated from calculating each distance from each position of each of the pixels to its corresponding nearest first lane candidate along the first direction which is parallel to a direction of rows of the training image by using the direct regression, and has generated a second pixel data map for training including information on each of the pixels and on its corresponding piece of second data, wherein one or more main subsets selected from the second data include each value generated from calculating each distance from said each position of each of the pixels to its corresponding nearest second lane candidate along the second direction which is parallel to the direction of the rows of the training image by using the direct regression; (iii) has detected the lanes by inference to the first pixel data map for training and the second pixel data map for training; and (iv) has performed processes of generating at least one first loss by referring to at least one first GT corresponding to the first pixel data map for training, generating at least one second loss by referring to at least one second GT corresponding to the second pixel data map for training, and backpropagating the first loss and the second loss, to thereby learn the parameters of the CNN.

Then, (i) the convolution operations may be applied to the test image and a feature map for testing may be generated, and lane candidate information for testing may be generated which represents information on lane candidates estimated by referring to segmentation scores for testing which are generated by using the feature map for testing; (ii) a first pixel data map for testing may be generated which includes information on each of pixels in the test image and on its corresponding piece of first data, wherein one or more main subsets selected from the first data include each value generated from calculating each distance from each position of each of the pixels to its corresponding nearest first lane candidate along the first direction by using the direct regression, and a second pixel data map for testing may be generated which includes information on each of the pixels and on its corresponding piece of second data, wherein one or more main subsets selected from the second data include each value generated from calculating each distance from said each position of each of the pixels to its corresponding nearest second lane candidate along the second direction by using the direct regression; and (iii) the segmentation result for testing may be generated and the lanes may be detected by inference to the first pixel data map for testing and the second pixel data map for testing.

As can be understood by those skilled in the art, it is clear that communication parts of the learning device and the testing device may perform transmission of image data, for example, images described above like the training image, the test image, the feature maps, etc., and that processors and/or memories of the learning device and the testing device may retain data for the feature maps and performing operations, and that the processors of the learning device and the testing device may perform convolution operations, deconvolution operations, and loss value operations, but the scope of the present invention is not limited thereto.

The present invention has an effect of generating the more accurate segmentation result by two-phased segmentation processes of the lane detection.

The present invention has another effect of detecting the lanes more accurately, by generating the segmentation results based on additional information on a gradient on a distance from each corresponding pixel of the lane candidates along the right direction and a gradient on a distance from each corresponding pixel of the lane candidates along the left direction.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A learning method of a convolutional neural network (CNN) implemented with a computer processor and capable of detecting one or more lanes, comprising steps of:
   (a) if at least one training image is acquired, applying or supporting another device to apply one or more convolution operations to the training image, to thereby generate at least one feature map, and generating or supporting another device to generate lane candidate information which represents information on lane candidates estimated by referring to segmentation scores generated by using the feature map;
   (b) generating or supporting another device to generate a first pixel data map including information on each of pixels in the training image and on its corresponding piece of first data, wherein one or more main subsets selected from the first data include each value generated from calculating each distance from each position of each of the pixels to its corresponding nearest first lane candidate along a first direction which is parallel to a direction of rows of the training image by using a direct regression, and generating or supporting another device to generate a second pixel data map including information on each of the pixels and on its corresponding piece of second data, wherein one or more main subsets selected from the second data include each value generated from calculating each distance from said each position of each of the pixels to its corresponding nearest second lane candidate along a second direction which is parallel to the direction of the rows of the training image by using the direct regression; and (c) detecting the lanes or supporting another device to detect the lanes by inference to the first pixel data map and the second pixel data map.

2. The learning method of claim 1, wherein the lanes are detected by referring to information on a first part of the pixels having its value less than a certain threshold in the first pixel data map and the second pixel data map.

3. The learning method of claim 1, wherein, at the step of (a), in response to determining that at least one specific row which has no lane candidate is determined as present by referring to the segmentation scores, allocating or supporting another device to allocate a first value to one or more pixels which are present on either the specific row or any row above the specific row, and allocating or supporting another device to allocate a second value to one or more pixels which are present below the specific row, to thereby generate a third pixel data map, and wherein, at the step of (c), the lanes are detected by inference to the first pixel data map, the second pixel data map, and the third pixel data map.

4. The learning method of claim 3, wherein the lanes are detected by referring to information on an intersection of (i) a first part of the pixels having its value less than a certain threshold in the first pixel data map and the second pixel data map and (ii) a second part of the pixels which are present below the specific row in the third pixel data map.

5. The learning method of claim 3, wherein the first value is a zero which represents a background.

6. The learning method of claim 3, further comprising a step of:

(d) performing or supporting another device to perform processes of generating at least one first loss by referring to at least one first ground truth (GT) corresponding to the first pixel data map, generating at least one second loss by referring to at least one second GT corresponding to the second pixel data map, generating at least one third loss by referring to at least one third GT corresponding to the third pixel data map, and backpropagating the first loss, the second loss, and the third loss, to thereby learn parameters of the CNN.

7. The learning method of claim 1, wherein said each value generated from said each distance calculated by the direct regression is one of each pixel distance from said each position of each of the pixels to its corresponding nearest first lane candidate along the first direction and each pixel distance from said each position of each of the pixels to its corresponding nearest second lane candidate along the second direction.

8. The learning method of claim 1, wherein complementary subsets of the first data, other than the main subsets of the first data, which do not require a calculation of any distance are assigned with infinity values.

9. A testing method of a convolutional neural network (CNN) implemented with a computer processor and capable of detecting one or more lanes, comprising steps of:

(a) acquiring or supporting another device to acquire at least one test image, on condition that the computer processor, (i) has applied one or more convolution operations to at least one training image, to thereby generate at least one feature map for training, and has generated lane candidate information for training which represents information on lane candidates estimated by referring to segmentation scores for training generated by using the feature map for training, (ii) has generated a first pixel data map for training including information on each of pixels in the training image and on its corresponding piece of first data for training, wherein one or more main subsets selected from the first data for training include each value generated from calculating each distance from each position of each of the pixels to its corresponding nearest first lane candidate for training along a first direction which is parallel to a direction of rows of the training image by using a direct regression, and has generated a second pixel data map for training including information on each of the pixels and on its corresponding piece of second data for training, wherein one or more main subsets selected from the second data for training include each value generated from calculating each distance from said each position of each of the pixels to its corresponding nearest second lane candidate for training along a second direction which is parallel to the direction of the rows of the training image by using the direct regression, (iii) has detected the lanes by inference to the first pixel data map for training and the second pixel data map for training, and (iv) has generated at least one first loss by referring to at least one first ground truth (GT) corresponding to the first pixel data map, and has generated at least one second loss by referring to at least one second GT corresponding to the second pixel data map, and backpropagating the first loss, and the second loss, to thereby learn one or more parameters of the CNN;

(b) applying or supporting another device to apply the convolution operations to the test image, to thereby generate at least one feature map for testing, and generating or supporting another device to generate lane candidate information for testing which represents information on lane candidates estimated by referring to segmentation scores for testing generated by using the feature map for testing;

(c) generating or supporting another device to generate a first pixel data map for testing including information on each of pixels in the test image and on its corresponding piece of first data for testing, wherein one or more main subsets selected from the first data for testing include each value generated from calculating each distance from each position of each of the pixels to its corresponding nearest first lane candidate for testing along the first direction by using the direct regression, and generating or supporting another device to generate a second pixel data map for testing including information on each of the pixels and on its corresponding piece of second data for testing, wherein one or more main subsets selected from the second data for testing include each value generated from calculating each distance from said each position of each of the pixels to its corresponding nearest second lane candidate for testing along the second direction by using the direct regression; and (d) detecting the lanes or supporting another device to detect the lanes by inference to the first pixel data map for testing and the second pixel data map for testing.

10. The testing method of claim 9, wherein the lanes are detected by referring to information on a first part of the pixels having its value less than a certain threshold in the first pixel data map for testing and the second pixel data map for testing.

11. The testing method of claim 9, wherein, at the step of (b), if at least one specific row which has no lane candidate is determined as present by referring to the segmentation scores for testing, allocating or supporting another device to allocate a first value to one or more pixels which are present on either the specific row or any row above the specific row, and allocating or supporting another device to allocate a second value to one or more pixels which are present below the specific row, to thereby generate a third pixel data map for testing, and wherein, at the step of (d), the lanes are detected by inference to the first pixel data map for testing, the second pixel data map for testing, and the third pixel data map for testing.

12. The testing method of claim 11, wherein the lanes are detected by referring to information on an intersection of (i) a first part of the pixels having its value less than a certain threshold in the first pixel data map for testing and the second pixel data map for testing and (ii) a second part of the pixels which are present below the specific row in the third pixel data map for testing.

13. The testing method of claim 9, wherein said each value generated from said each distance calculated by the direct regression is one of each pixel distance from said each position of each of the pixels to its corresponding nearest first lane candidate for testing along the first direction and each pixel distance from said each position of each of the pixels to its corresponding nearest second lane candidate for testing along the second direction.

14. The testing method of claim 9, wherein complementary subsets of the first data for testing, other than the main subsets of the first data for testing, which do not require a calculation of any distance are assigned with infinity values.

15. A learning device of a convolutional neural network (CNN) capable of detecting one or more lanes, comprising:

a processor configured to perform processes of (I) applying or supporting another device to apply one or more convolution operations to the training image, to thereby generate at least one feature map, and generating or supporting another device to generate lane candidate information which represents information on lane candidates estimated by referring to segmentation scores generated by using the feature map; (II) generating or supporting another device to generate a first pixel data map including information on each of pixels in the training image and on its corresponding piece of first data, wherein one or more main subsets selected from the first data include each value generated from calculating each distance from each position of each of the pixels to its corresponding nearest first lane candidate along a first direction which is parallel to a direction of rows of the training image by using a direct regression, and generating or supporting another device to generate a second pixel data map including information on each of the pixels and on its corresponding piece of second data, wherein one or more main subsets selected from the second data include each value generated from calculating each distance from said each position of each of the pixels to its corresponding nearest second lane candidate along a second direction which is parallel to the direction of the rows of the training image by using the direct regression; and (III) detecting the lanes or supporting another device to detect the lanes by inference to the first pixel data map and the second pixel data map.

16. The learning device of claim 15, wherein the lanes are detected by referring to information on a first part of the pixels having its value less than a certain threshold in the first pixel data map and the second pixel data map.

17. The learning device of claim 15, wherein, at the process of (I), the processor, if at least one specific row which has no lane candidate is determined as present by referring to the segmentation scores, allocates or supports another device to allocate a first value to one or more pixels which are present on either the specific row or any row above the specific row, and allocating or supporting another device to allocate a second value to one or more pixels which are present below the specific row, to thereby generate a third pixel data map, and wherein, at the process of (III), the lanes are detected by inference to the first pixel data map, the second pixel data map, and the third pixel data map.

18. The learning device of claim 17, wherein the lanes are detected by referring to information on an intersection of (i) a first part of the pixels having its value less than a certain threshold in the first pixel data map and the second pixel data map and (ii) a second part of the pixels which are present below the specific row in the third pixel data map.

19. The learning device of claim 17, wherein the first value is a zero which represents a background.

20. The learning device of claim 17, wherein the processor further performs a process of:

(IV) generating or supporting another device to generate at least one first loss by referring to at least one first ground truth (GT) corresponding to the first pixel data map, generating or supporting another device to generate at least one second loss by referring to at least one second GT corresponding to the second pixel data map, generating or supporting another device to generate at least one third loss by referring to at least one third GT corresponding to the third pixel data map, and backpropagating or supporting another device to backpropagate the first loss, the second loss, and the third loss, to thereby learn parameters of the CNN.

21. The learning device of claim 15, wherein said each value generated from said each distance calculated by the direct regression is one of each pixel distance from said each position of each of the pixels to its corresponding nearest first lane candidate along the first direction and each pixel distance from said each position of each of the pixels to its corresponding nearest second lane candidate along the second direction.

22. The learning device of claim 15, wherein complementary subsets of the first data, other than the main subsets of the first data, which do not require a calculation of any distance are assigned with infinity values.

23. A testing device of a convolutional neural network (CNN) capable of detecting one or more lanes, comprising:

a processor configured to acquire or support another device to acquire at least one test image, on condition that a learning device (i) has applied one or more convolution operations to at least one training image, to thereby generate at least one feature map for training, and has generated lane candidate information for training which represents information on lane candidates estimated by referring to segmentation scores for training generated by using the feature map for training, (ii) has generated a first pixel data map for training including information on each of pixels in the training image and on its corresponding piece of first data for training, wherein one or more main subsets selected from the first data for training include each value generated from calculating each distance from each position of each of the pixels to its corresponding nearest first lane candidate for training along a first direction which is parallel to a direction of rows of the training image by using a direct regression, and has generated a second pixel data map for training including information on each of the pixels and on its corresponding piece of second data for training, wherein one or more main subsets selected from the second data for training include each value generated from calculating each distance from said each position of each of the pixels to its corresponding nearest second lane candidate for training along a second direction which is parallel to the direction of the rows of the training image by using the direct regression, (iii) has detected the lanes by inference to the first pixel data map for training and the second pixel data map for training, and (iv) has generated at least one first loss by referring to at least one first ground truth (GT) corresponding to the first pixel data map, and has generated at least one second loss by referring to at least one second GT corresponding to the second pixel data map, and backpropagating the first loss, and the second loss, to thereby learn one or more parameters of the CNN; wherein the processor is further configured to perform processes of (I) applying or supporting another device to apply the convolution operations to the test image, to thereby generate at least one feature map for testing, and generating or supporting another device to generate lane candidate information for testing which represents information on lane candidates estimated by referring to segmentation scores for testing generated by using the feature map for testing; (II) generating or supporting another device to generate a first pixel data map for testing including information on each of pixels in the test image and on its corresponding piece of first data for testing, wherein one or more main subsets selected from the first data for testing include each value generated from calculating each distance from each position of each of the pixels to its corresponding nearest first lane candidate for testing along the first direction which is parallel to a direction of rows of the test image by using the direct regression, and generating or supporting another device to generate a second pixel data map for testing including information on each of the pixels and on its corresponding piece of second data for testing, wherein one or more main subsets selected from the second data for testing include each value generated from calculating each distance from said each position of each of the pixels to its corresponding nearest second lane candidate for testing along the second direction which is parallel to the direction of the rows of the test image by using the direct regression; and (III) detecting the lanes or supporting another device to detect the lanes by inference to the first pixel data map for testing and the second pixel data map for testing.

24. The testing device of claim 23, wherein the lanes are detected by referring to information on a first part of the pixels having its value less than a certain threshold in the first pixel data map for testing and the second pixel data map for testing.

25. The testing device of claim 23, wherein, at the process of (II), the processor, if at least one specific row which has no lane candidate is determined as present by referring to the segmentation scores for testing, allocates or supports another device to allocate a first value to one or more pixels which are present on either the specific row or any row above the specific row, and allocating or supporting another device to allocate a second value to one or more pixels which are present below the specific row, to thereby generate a third pixel data map for testing, and wherein, at the process of (III), the lanes are detected by inference to the first pixel data map for testing, the second pixel data map for testing, and the third pixel data map for testing.

26. The testing device of claim 25, wherein the lanes are detected by referring to information on an intersection of (i) a first part of the pixels having its value less than a certain threshold in the first pixel data map for testing and the second pixel data map for testing and (ii) a second part of the pixels which are present below the specific row in the third pixel data map for testing.

27. The testing device of claim 23, wherein said each value generated from said each distance calculated by the direct regression is one of each pixel distance from said each position of each of the pixels to its corresponding nearest first lane candidate for testing along the first direction and each pixel distance from said each position of each of the pixels to its corresponding nearest second lane candidate for testing along the second direction.

28. The testing device of claim 23, wherein complementary subsets of the first data for testing, other than the main subsets of the first data for testing, which do not require a calculation of any distance are assigned with infinity values.

* * * * *